US012761438B2

(12) United States Patent
Vigneault et al.

(10) Patent No.: US 12,761,438 B2
(45) Date of Patent: Oct. 13, 2026

(54) MODULE COMPRISING DROP-IN ADAPTERS

(71) Applicant: THE LAN WIREWERKS RESEARCH LABORATORIES INC., Baie-d'Urfé (CA)

(72) Inventors: Simon Vigneault, Rigaud (CA); Edouard Tabet, St-Phillipe (CA)

(73) Assignee: THE LAN WIREWERKS RESEARCH LABORATORIES INC., Baie-d'Urfé (CA)

( * ) Notice: Subject to any disclaimer, the term of this patent is extended or adjusted under 35 U.S.C. 154(b) by 208 days.

(21) Appl. No.: 18/545,655

(22) Filed: Dec. 19, 2023

(65) Prior Publication Data

US 2024/0201463 A1 Jun. 20, 2024

Related U.S. Application Data

(60) Provisional application No. 63/433,640, filed on Dec. 19, 2022.

(51) Int. Cl.
*G02B 6/44* (2006.01)
*G02B 6/38* (2006.01)

(52) U.S. Cl.
CPC ......... *G02B 6/4452* (2013.01); *G02B 6/3825* (2013.01); *G02B 6/3897* (2013.01); *G02B 6/44528* (2023.05); *G02B 6/4477* (2013.01)

(58) Field of Classification Search
None
See application file for complete search history.

(56) References Cited

U.S. PATENT DOCUMENTS

| | | | | | |
|---|---|---|---|---|---|
| 5,804,765 | A * | 9/1998 | Siemon | G02B 6/4454 | 174/651 |
| 7,756,378 | B2 * | 7/2010 | Ruiz | G02B 6/44765 | 385/136 |
| 7,945,135 | B2 * | 5/2011 | Cooke | G02B 6/44526 | 385/135 |
| 2009/0220204 | A1 * | 9/2009 | Ruiz | G02B 6/44785 | 385/135 |
| 2010/0054685 | A1 * | 3/2010 | Cooke | G02B 6/44528 | 385/135 |
| 2010/0322580 | A1 * | 12/2010 | Beamon | G02B 6/44526 | 385/135 |
| 2010/0322581 | A1 * | 12/2010 | Cooke | G02B 6/44526 | 385/135 |
| 2010/0322583 | A1 * | 12/2010 | Cooke | G02B 6/4453 | 385/135 |
| 2012/0114295 | A1 * | 5/2012 | Guzzo | G02B 6/44528 | 385/135 |

(Continued)

*Primary Examiner* — Jerry Rahll
(74) *Attorney, Agent, or Firm* — MBM Intellectual Property Law LLP

(57) ABSTRACT

The present invention provides a module for use in a patch panel comprising: a housing; one or more drop-in fiber adapters; one or more drop-in rear adapters; and a removable housing cover. The housing comprises a planar base extending between a first and second end; one or more drop-in fiber adapter seats arranged transversely along the first end of the housing configured to receive the fiber adapters in a vertical direction; and one or more drop-in rear adapter seats located in the rear wall at the second end of the housing configured to receive a respective rear adapter in a vertical direction.

22 Claims, 9 Drawing Sheets

(56) References Cited

U.S. PATENT DOCUMENTS

| | | | | |
|---|---|---|---|---|
| 2016/0062055 | A1* | 3/2016 | Giraud ................. | G02B 6/3825 385/56 |
| 2016/0299308 | A1* | 10/2016 | Wiltjer ............... | G02B 6/44528 |

* cited by examiner

MODULE COMPRISING DROP-IN ADAPTERS

FIELD OF THE INVENTION

The present invention pertains to the field of fiber optics and in particular to the management and deployment of fiber optic cables.

BACKGROUND

In the telecommunications industry, use of fiber optic cables for carrying transmission signals is rapidly growing. Fiber distribution frames are adapted to aid in the connection of fiber optic equipment. To connect fiber optic equipment in the fiber distribution frame or to connect fiber optic equipment between fiber distribution frames, fiber optic cable is routed between the fiber optic equipment and/or the fiber distribution frames.

The deployment of factory pre-terminated fiber optic cables is crucial for minimizing network downtime for cable installation.

Therefore, there is a need for system that allow for the convenient introduction of pre-terminated fiber assemblies into a module for rapid deployment in a patch panel.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a module comprising drop-in adapters. In accordance with an aspect of the present invention, there is provided a module for use in a patch panel, the module comprising: one or more drop-in fiber adapters; one or more drop-in rear adapters; a housing having a first (forward) end and a second (rearward) end, the housing comprising: a planar base extending between said first end and said second end, two sidewalls extending upwardly from the longitudinal edges of said base and a rear wall extending upwardly from the transversal edge at said second end; one or more drop-in fiber adapter seats located/arranged transversely along said first end of the housing, each said fiber adapter seat being defined by respective upwardly extending lateral walls, wherein the lateral walls of the adapter seats are configured to receive the fiber adapter in a vertical direction; and one or more drop-in rear adapter seats located in the rear wall at said second end of the housing, each said rear adapter seat being configured to slidably receive a respective rear adapter in a vertical direction; and a removable housing cover.

In accordance with another aspect of the present invention, there is provided a cable distribution system comprising: one or more modules in accordance with the present invention; and at least one panel configured to receive the one or more patch modules in respective module channels.

In accordance with another aspect of the present invention, there is provided a method for assembling a module comprising an end-to-end connected fiber assembly, comprising the steps of: providing a housing having a first (forward) end and a second (rearward) end, the housing comprising: a planar base extending between said first end and said second end, two sidewalls extending upwardly from the longitudinal edges of said base and a rear wall extending upwardly from the transversal edge at said second end; one or more drop-in fiber adapter seats located/arranged transversely along said first end of the housing, each said fiber adapter seat being defined by respective upwardly extending lateral walls, wherein the lateral walls of the adapter seats are configured to receive the fiber adapter in a vertical direction; and one or more drop-in rear adapter seats located in the rear wall at said second end of the housing, each said rear adapter seat being configured to slidably receive a respective rear adapter in a vertical direction; and providing a fiber assembly comprising a fiber harness plugged into at least one fiber adapter at a first end and at least one rear adapter at a second end; dropping the fiber assembly into the housing, wherein each said fiber adapter is placed in a respective fiber adapter seat and each said rear adapter is placed in a respective rear adapter seat; and installing a cover onto the housing.

DETAILED DESCRIPTION OF THE INVENTION

Figure 1:
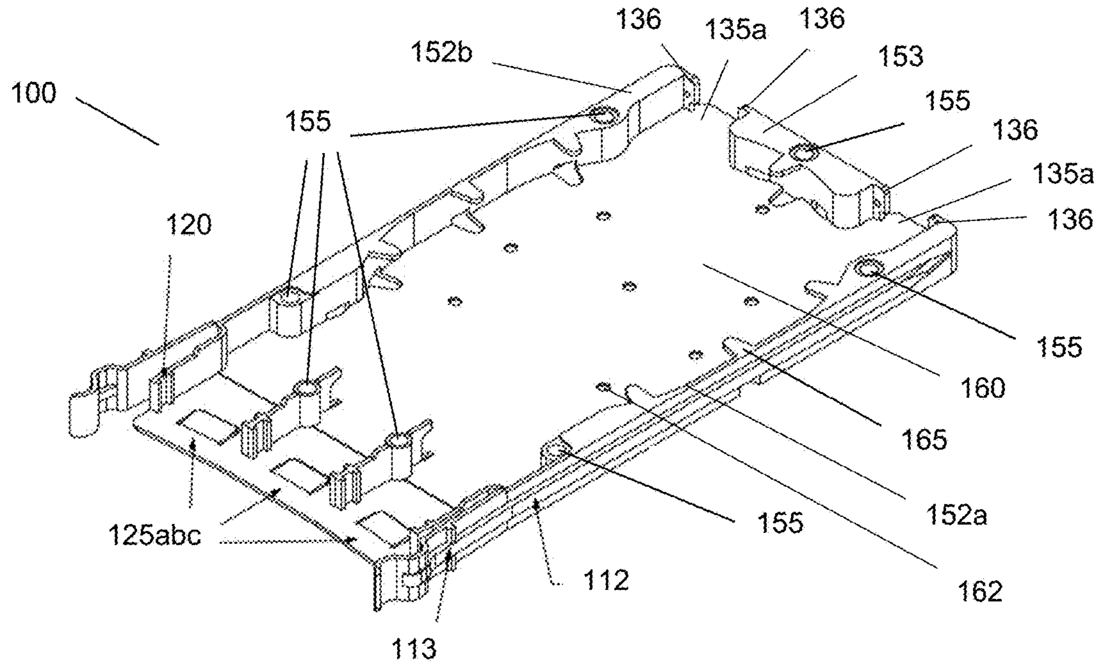
FIG. 1 illustrates a perspective top front view of a housing, in accordance with one embodiment of the present invention.

The terms “cable”, “fiber cable” and “fiber optic cable” are used interchangeably in the present specification.

The abbreviation “MPO” stands for “multi-fiber push-on” and refers to a type of optical connector employed at the end of multi-core optical fibers.

The abbreviations “LC”, “SC” and “SN” refer to types of fiber-optic connectors.

As used herein, the term “about” refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a module for use in a patch panel. The module comprises a housing, a removable housing cover, one or more drop-in fiber adapters and one or more drop-in rear adapters. The housing comprises one or more drop-in fiber adapter seats located/arranged transversely along one end of the housing, wherein each fiber adapter seat is defined by respective upwardly extending lateral walls configured to receive the fiber adapter in a vertical direction. The housing also comprises one or more drop-in rear adapter seats located at the other (rear) end of the housing.

The housings of the present invention offer flexibility and are suitable for use in distribution module systems as well as patch module systems.

The use of drop-in adapters provides a convenient way to introduce pre-terminated fiber assemblies into the module housing. The housings of the present invention can also accommodate drop-in MPO adapters or strain relief adapters at the rear portion of the housing. The use of drop-in adapters allows for the simple and convenient introduction of pre-terminated fiber assemblies into a module.

In one embodiment, the present invention provides a method for assembling an end-to-end connected live signal assembly comprising providing an assembled fiber assembly comprising a fiber harness plugged into at least one fiber adapter at a first end of the fiber harness and at least one rear adapter at the other end. The fiber assembly is then dropped into a housing in accordance with the present invention, wherein the fiber adapters are placed in a respective fiber adapter seat and the rear adapters are placed in a respective rear adapter seat. The cover is then installed onto the housing to provide a module ready for insertion into a patch panel.

The housing for use in the modules of the present invention is formed with two sidewalls extending upwardly along longitudinal edges of a planar base extending between first and second ends of the housing, and a rear wall extending upwardly from the transversal edge along the second end. Each sidewall comprises a linear guide rail on an external surface configured for sliding engagement with complementary sliding guides located in the module channels of the patch panel.

In a preferred embodiment, the module comprises three drop-in fiber adapters located in respective drop-in fiber adapter seats at the first end of the housing. In accordance with the present invention, the fiber adapters can be LC adapters, SN adapters or SC adapters.

In one embodiment, each drop-in fiber adapter comprises a tab on each lateral/side surface, and the lateral walls of the adapter seats each comprise a vertical slot configured to receive respective tabs of the fiber adapter.

In embodiments where the module comprises three fiber adapters, the two outermost fiber adapters are each seated at an inward angle of between about 4 to about 7 degrees relative to a transverse axis of the module. In a preferred embodiment, the outermost fiber adapters are seated at an inward angle of about 5 degrees relative to the transverse axis of the module.

The drop-in rear adapter seats located along the second (rear) end of the housing are configured to receive a respective rear adapter in a vertical direction.

In one embodiment, the module comprises two rear adapters.

In one embodiment, the lateral walls of the rear adapter seats each form a tab, and each rear adapter comprises a vertical slot on each lateral/side surface configured to slidably receive a respective tab of the rear adapter.

In one embodiment, the rear adapter is an MPO adapter.

In one embodiment, the rear adapter is a strain relief adapter. In one embodiment, the strain relief adapter comprises a cable strain relief clamp and a rubber insert configured to fit within the strain relief clamp.

In one embodiment, the rear adapter comprises a strain relief clamp and a fan-out kit housing.

In one embodiment, the housing comprises an open interior area in which cable management accessories are mounted to the planar base.

The housing is further provided with a removable housing cover. In one embodiment, the housing cover is formed from a metallic or rigid polymeric material. In a preferred embodiment, the housing cover is formed from a metallic material. In one embodiment, the housing cover is removably attached to the housing using screws.

The modules are configured for insertion into the module channels of rack units. In one embodiment, each rack unit has four module channels, wherein each module channel can accommodate up to three modules.

In one embodiment, installation and removal of the module from the patch panel do not require the use of tools. In one embodiment, the module is held in place through the use of secure click-in-place stops.

In one embodiment of the present invention, there is provided a cable distribution system comprising a patch panel (or rack unit) employed in combination with one or more modules of the present invention. In a preferred embodiment, the modules can be inserted into the patch panel from both the front and the rear of the patch panel.

In one embodiment, the installation is carried out by sliding the module into place in the module channel. In one embodiment, the two linear guide rails on the walls of the housing engage complementary sliding guides on the module channels/openings to facilitate sliding insertion of the module into place in the patch panel.

To facilitate insertion of the module into the patch panel, the sidewalls of the housing comprise linear guide rails on an external surface configured for sliding engagement with complementary sliding guides in the module channels of the patch panel.

The system of the present invention provides high fiber density in a compact space. For example, if each module is a 24F module (i.e., each module comprising three SN drop-in adapters to provide 24 fibers per module), and three modules are deployed in each of the four module channels of the rack unit, the resulting fiber density is 288 fibers per RU. If each module is a 12F module, (i.e., each module comprising three LC drop-in adapters to provide 12 fibers per module), and modules are deployed in each of the four module channels of the rack unit, the resulting fiber density is 144 fibers per RU. If each module is a 6F module (i.e., each module comprising three SC drop-in adapters to provide 12 fibers per module), and three modules are deployed in each of the four module channels of the rack unit, the resulting fiber density is 72 fibers per RU.

It is within the scope of the invention to “mix and match” the patch and distribution modules for deployment within a single patch panel.

It is understood that a patch panel can be installed in a horizontal or vertical orientation, so that the use of relative terms such as “upper” and “lower”, “upward” and “downward”, and “top” and “bottom” are used to describe orientations and locations relative to the patch panel itself, regardless of its orientation in space.

The invention will now be described with reference to specific examples. It will be understood that the following examples are intended to describe embodiments of the invention and are not intended to limit the invention in any way.

Figure 2:
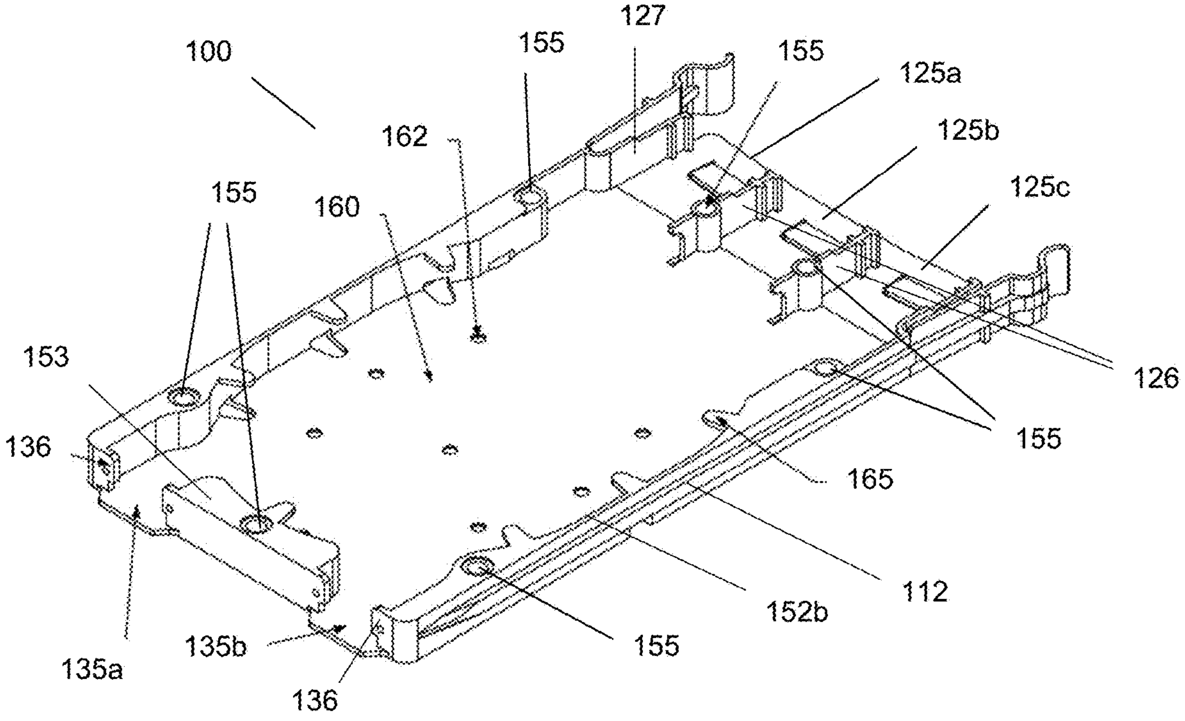
FIG. 2 illustrates a perspective top rear view of a housing, in accordance with one embodiment of the present invention.

FIGS. 1 and 2 depict housing 100 used in the drop-in modules of the present invention. Housing 100 includes sidewalls 152*a* and 152*b* and rear wall 153. Sidewall 152*a* includes linear guide rail 112 which is configured for sliding engagement with complementary sliding guides in the patch panel (not shown). The housing includes three fiber adapter seats 125*a*, 125*b*, and 125*c* defined by two fiber adapter seat interior sidewalls 126 and two lateral sidewalls 127. Each of the interior and lateral sidewalls further include vertical slot 120 adapted to receive fiber adapter tabs 122 located on each side of the fiber adapters (not shown). The housing also includes two rear adapters seats 135*a* and 135*b* located on rear wall 153. The lateral edges of the rear adapter seats are formed as guiding tabs 136. The housing has a planar base 160 having multiple mounting holes 162 arranged thereon for mounting cable management components (not shown). Sidewalls 152*a* and 152*b* and rear wall 155 also comprise a series of inwardly facing cable management tabs 165, positioned to assist with retention of a wound cable within the interior of the housing. A series of cover alignment holes 155 are located around the periphery of the housing on sidewalls 152*a* and 152*b* and rear wall 153 which are adapted to receive threaded screws for attachment of a cover (not shown).

FIGS. 3, 5, 7, 9, 10, 11, 12, 13 and 14 depict embodiments of drop-in modules employing the housing of FIGS. 1 and 2.

Figure 3:
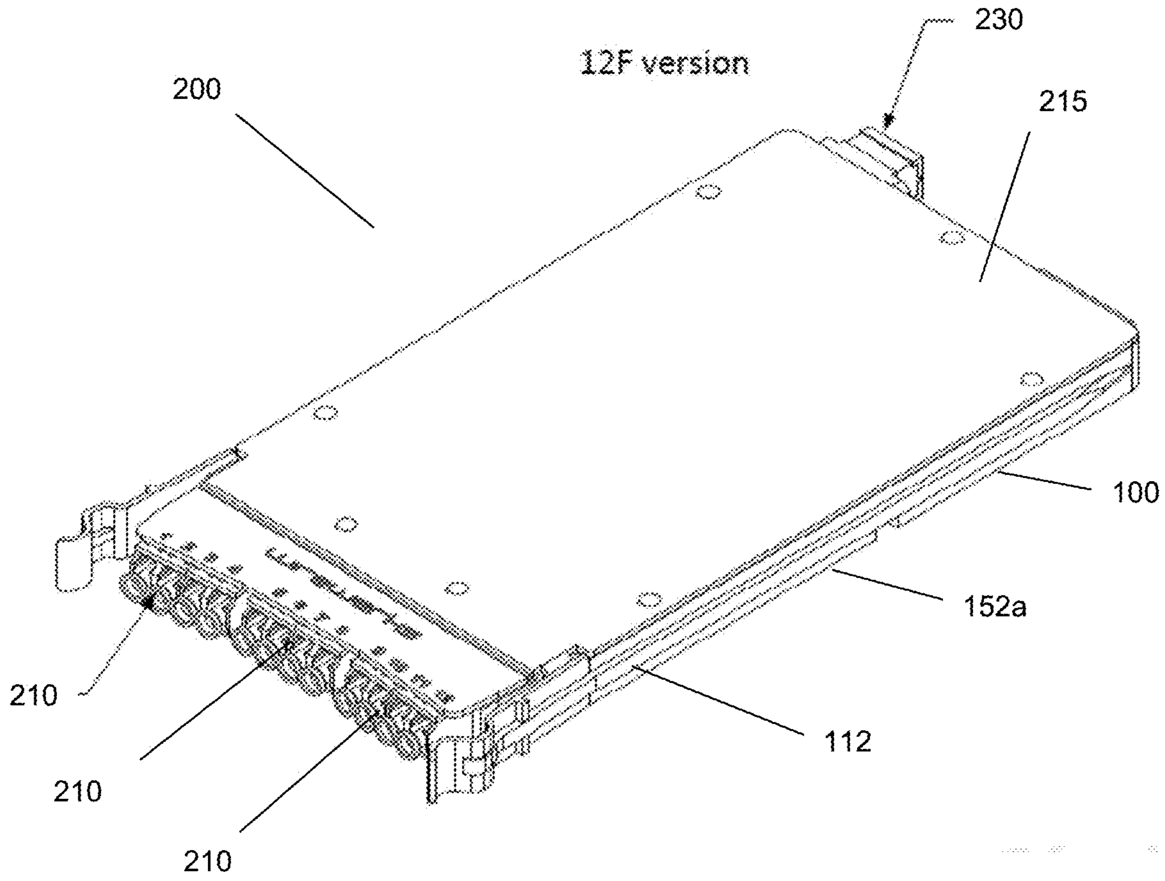
FIG. 3 illustrates a perspective top view of a 12F distribution module, in accordance with one embodiment of the present invention.
Figure 4:
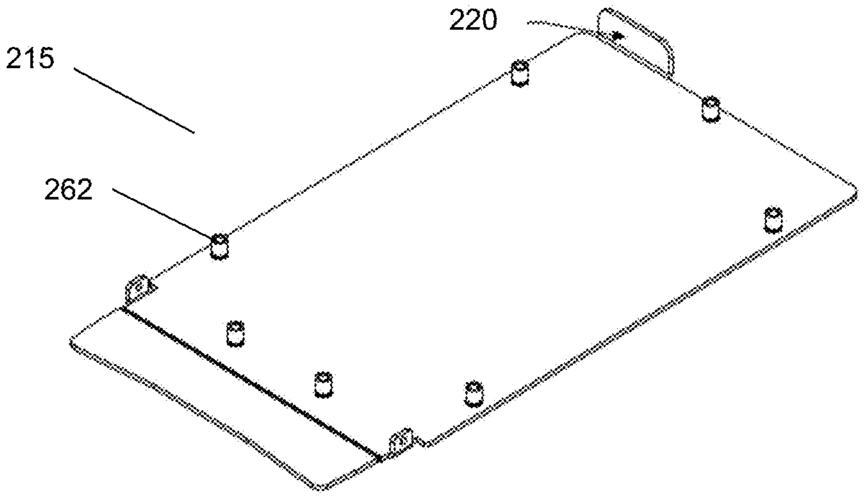
FIG. 4 illustrates a perspective view of the underside of 12F distribution module cover, in accordance with one embodiment of the present invention.

The module depicted in FIG. 3 is 12F distribution module 200 comprising housing 100, shown with cover 215 attached to the housing. This embodiment includes three LC fiber adapters 210. Sidewall 152*a* includes linear guide rail 112 which is configured for sliding engagement with complementary sliding guides in the patch panel (not shown). Distribution module 200 includes a single MPO adapter 230 seated in a rear adapter seat located on the rear wall (not shown). FIG. 4 is an underside view of cover 215, showing rear seat cover flange 220 provided to cover the unoccupied rear adapter seat, as well as the series of guide inserts 262, adapted to fit into respective cover alignment holes 155 in the housing (not shown). The cover can be attached to the housing through the use of screws threaded through guide inserts 262 and into respective alignment holes 155.

Figure 5:
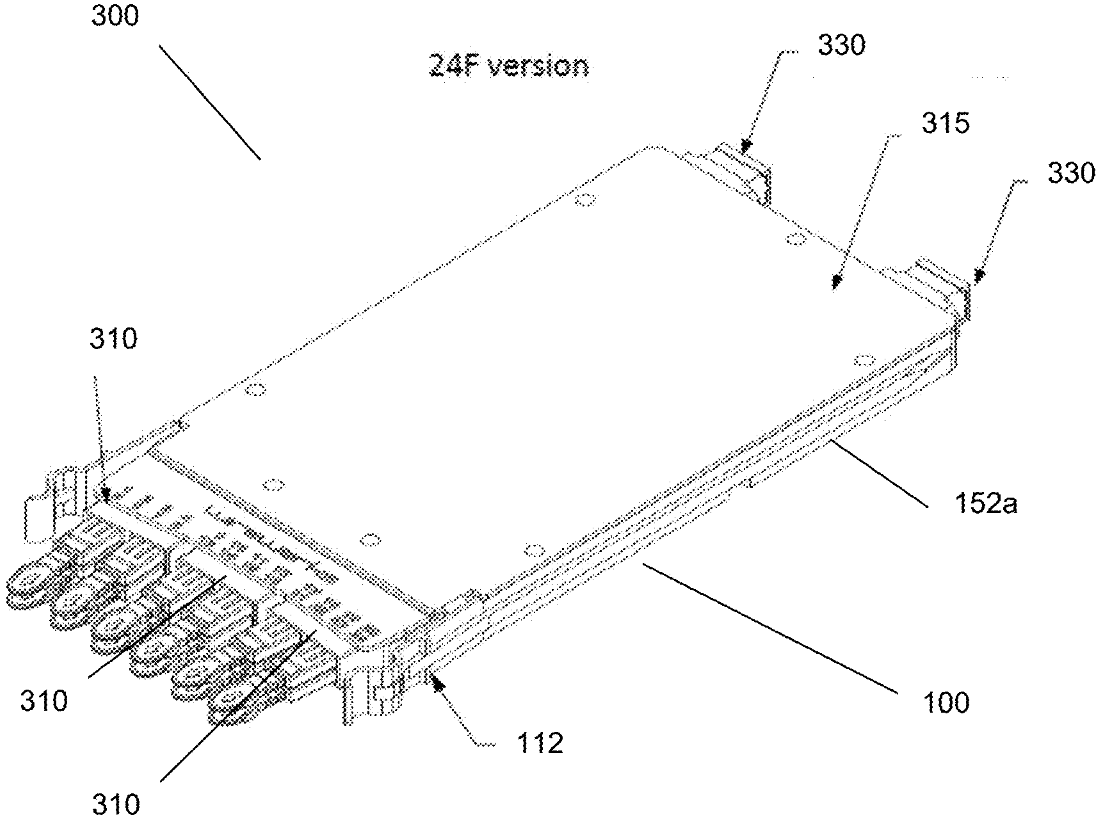
FIG. 5 illustrates a perspective top view of a 24F module, in accordance with one embodiment of the present invention.
Figure 6:
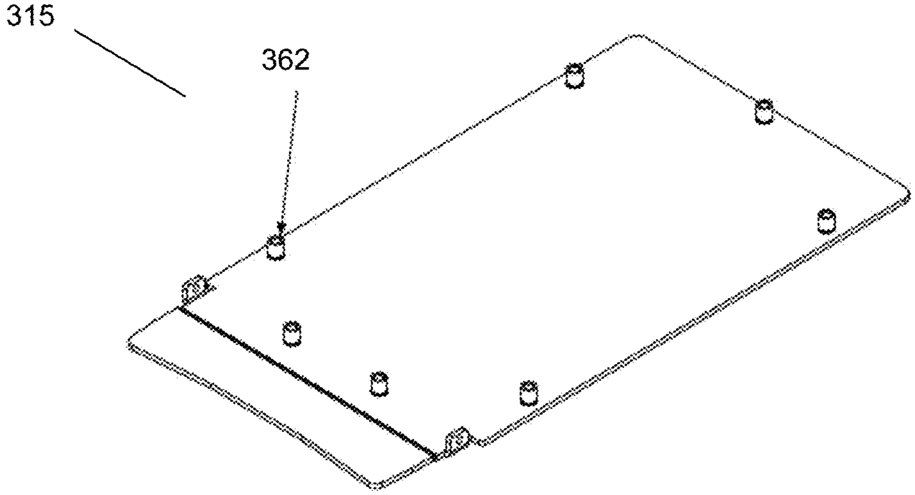
FIG. 6 illustrates a perspective view of the underside of 24F module cover, in accordance with one embodiment of the present invention.

FIG. 5 depicts a 24F distribution module 300 comprising housing 100, shown with cover 315 attached to the housing. This embodiment includes three SN fiber adapters 310. Sidewall 152*a* includes linear guide rail 112 which is configured for sliding engagement with complementary sliding guides in the patch panel (not shown). Distribution module 300 includes two MPO adapters 330 seated in rear adapter seats located on the rear wall (not shown). FIG. 6 is an underside view of cover 315, showing a series of guide inserts 362, adapted to fit into respective cover alignment holes 155 in the housing. Cover 315 can be attached to the housing through the use of screws threaded through guide inserts 362 and into respective alignment holes 155.

Figure 7:
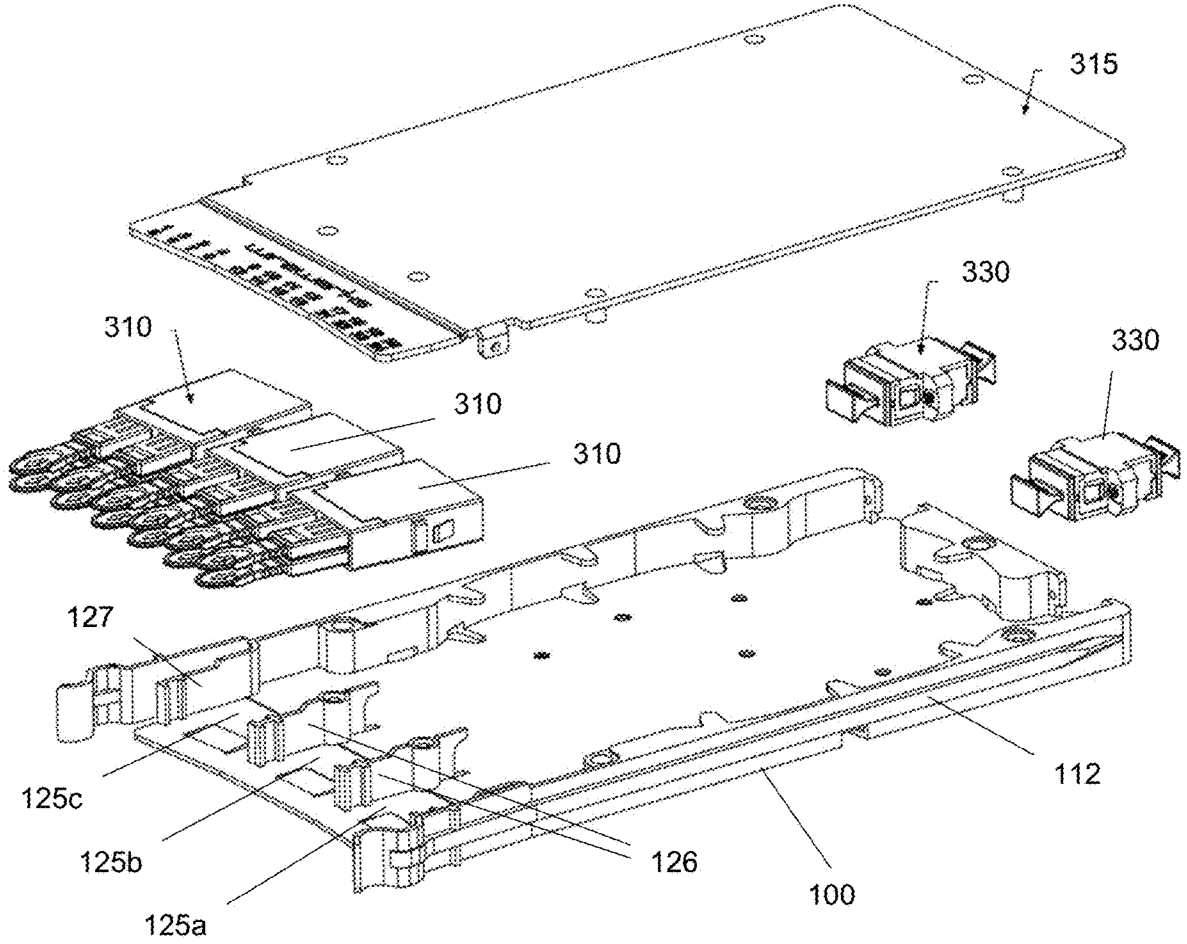
FIG. 7 illustrates an exploded perspective top view of a 24F distribution module with housing cover removed, in accordance with one embodiment of the present invention.

FIG. 7 depicts a 24F distribution module 300 comprising housing 100, shown with cover 315 detached from the housing. This figure shows three SN fiber adapters 310 located in respective fiber adapter seats 125*a*, 125*b* and 125*c*, defined by fiber adapter seat interior sidewalls 126 and lateral sidewalls 127. The housing includes sidewalls 152*a* and 152*b* and rear wall 153. Sidewall 152*a* is shown with linear guide rail 112 configured for sliding engagement with complementary sliding guides in the patch panel (not shown). Module 300 includes two MPO adapters 330 for seating in rear adapter seats located on rear wall 153.

Figure 8:
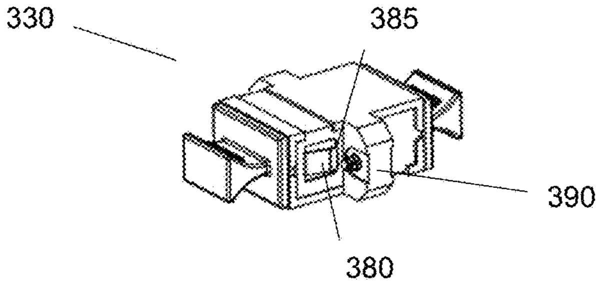
FIG. 8 illustrates a perspective top view of an MPO adapter, suitable for use with a housing in accordance with one embodiment of the present invention.

FIG. 8 is an MPO adapter 330 suitable for use with modules of the present invention. Adapter 330 is configured for installation in respective rear adapter seats through sliding engagement of channel 385 located on each lateral side of adapter 330 by insertion of sliding tabs 136 through channel 385. Channel 385 is formed between flange 390 and protrusion 380.

Figure 9:
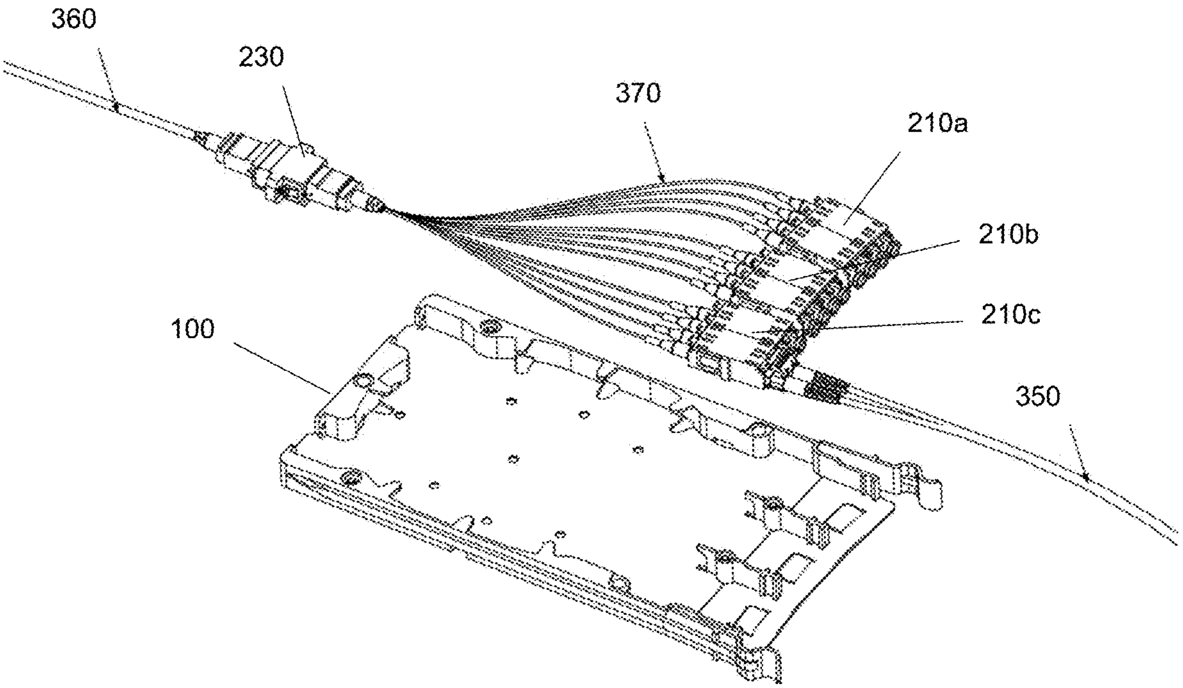
FIG. 9 illustrates a perspective top view of the connected components of a 12F distribution module, in accordance with one embodiment of the present invention.

FIG. 9 shows an end-to-end connected live signal assembly ready for installation into housing 100. The assembly includes fiber harness 370 plugged into respective fiber adapters 210*a*, 210*b* and 210*c* at one end and MPO adapter 230 at the other, which is further connected to MPO cable 360. Also shown is a fiber patch cord 350 plugged into fiber adapter 210*c*.

Figure 10:
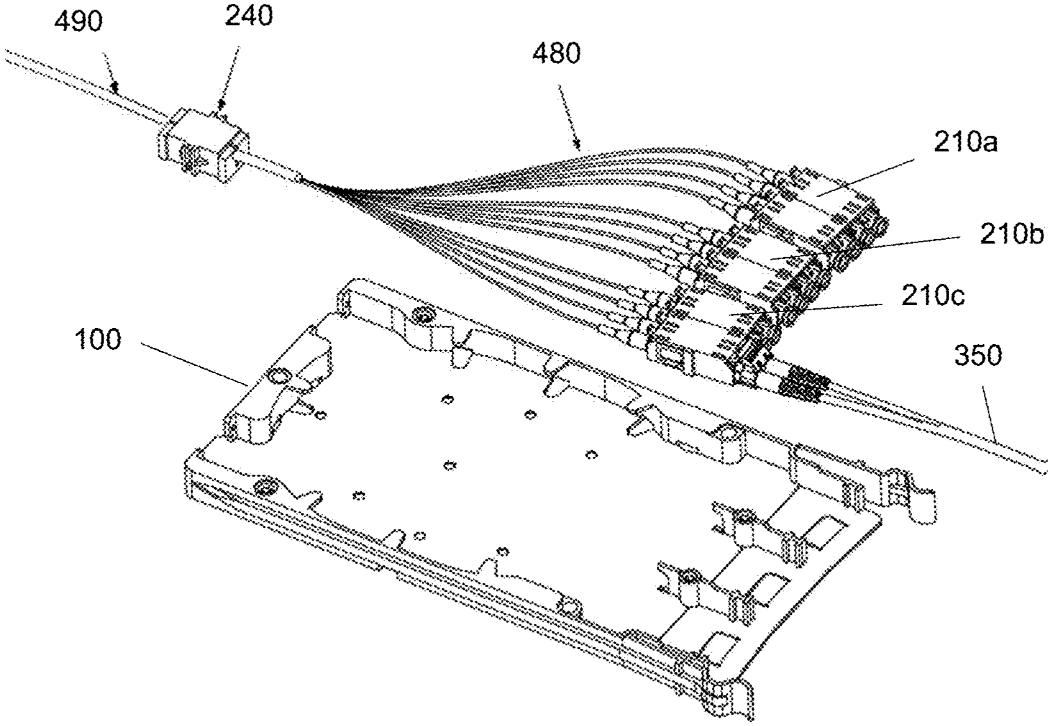
FIG. 10 illustrates a perspective top view of the connected components of a 12F patch module, in accordance with one embodiment of the present invention.

FIG. 10 shows an end-to-end connected live signal assembly with pre-terminated fiber cable assembly ready for installation into housing 100. The assembly includes fiber breakout 480 plugged into respective fiber adapters 210*a*, 210*b* and 210*c* at one end and strain relief adapter 240 at the other, which is further connected to pre-terminated cable 490. Also shown is a fiber patch cord 350 plugged into fiber adapter 210*c*.

Figure 11:
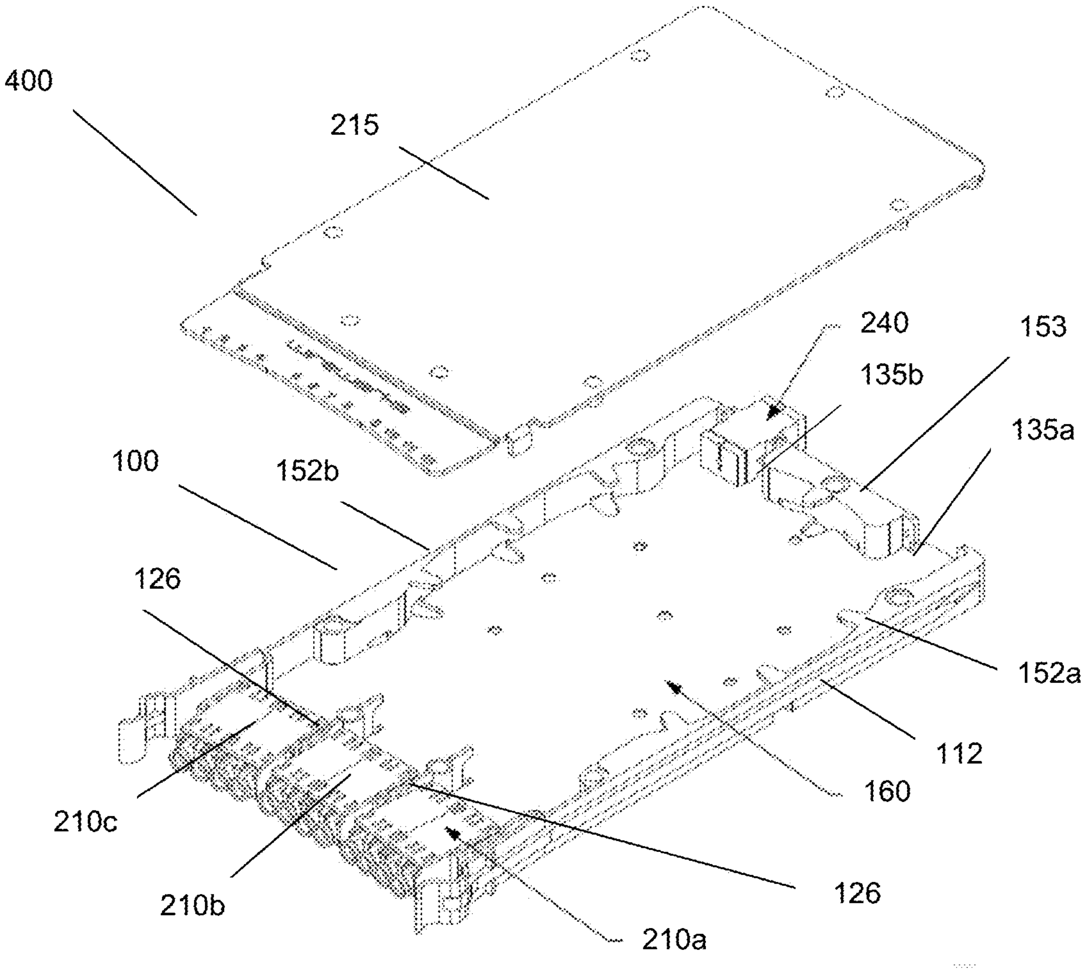
FIG. 11 illustrates a partially exploded perspective top view of a 12F patch module with drop-in cable strain relief adapter, in accordance with one embodiment of the present invention.

FIG. 11 depicts a 12F patch module 400 comprising housing 100, shown with cover 215 removed from the housing. This embodiment includes three LC fiber adapters 210. The housing includes sidewalls 152*a* and 152*b* and rear wall 153, and sidewall 152*a* is shown with linear guide rail 112. Patch module 400 includes a single strain relief adapter 240 seated in rear adapter seat 135*b* located on the rear wall 153, as well as unoccupied rear adapter seat 135*a*.

Figure 12:
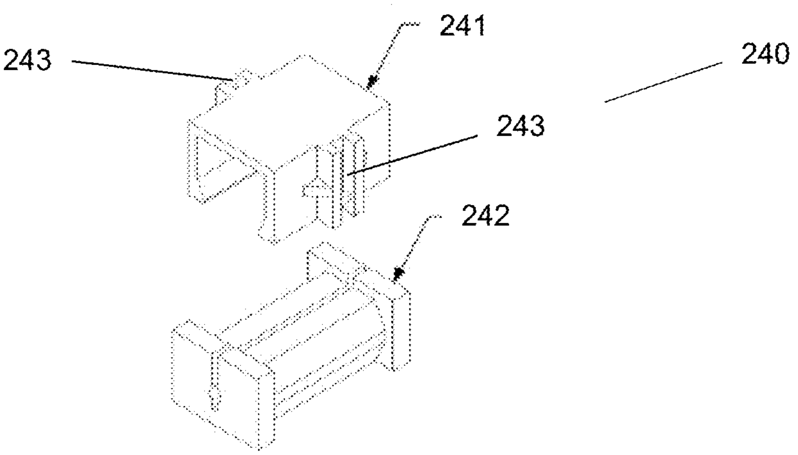
FIG. 12 illustrates an exploded perspective top view of a drop-in cable strain relief adapter, suitable for use with a patch module, in accordance with one embodiment of the present invention.

FIG. 12 depicts an exploded view of strain relief adapter 240, including strain relief clamp 241 and strain relief insert 242. Strain relief adapter 240 is configured for installation in respective rear adapter seats through sliding engagement of strain relief adapter slots 243 located on each lateral side of adapter 240, which are configured to receive rear adapter seat tabs 136.

Figure 13:
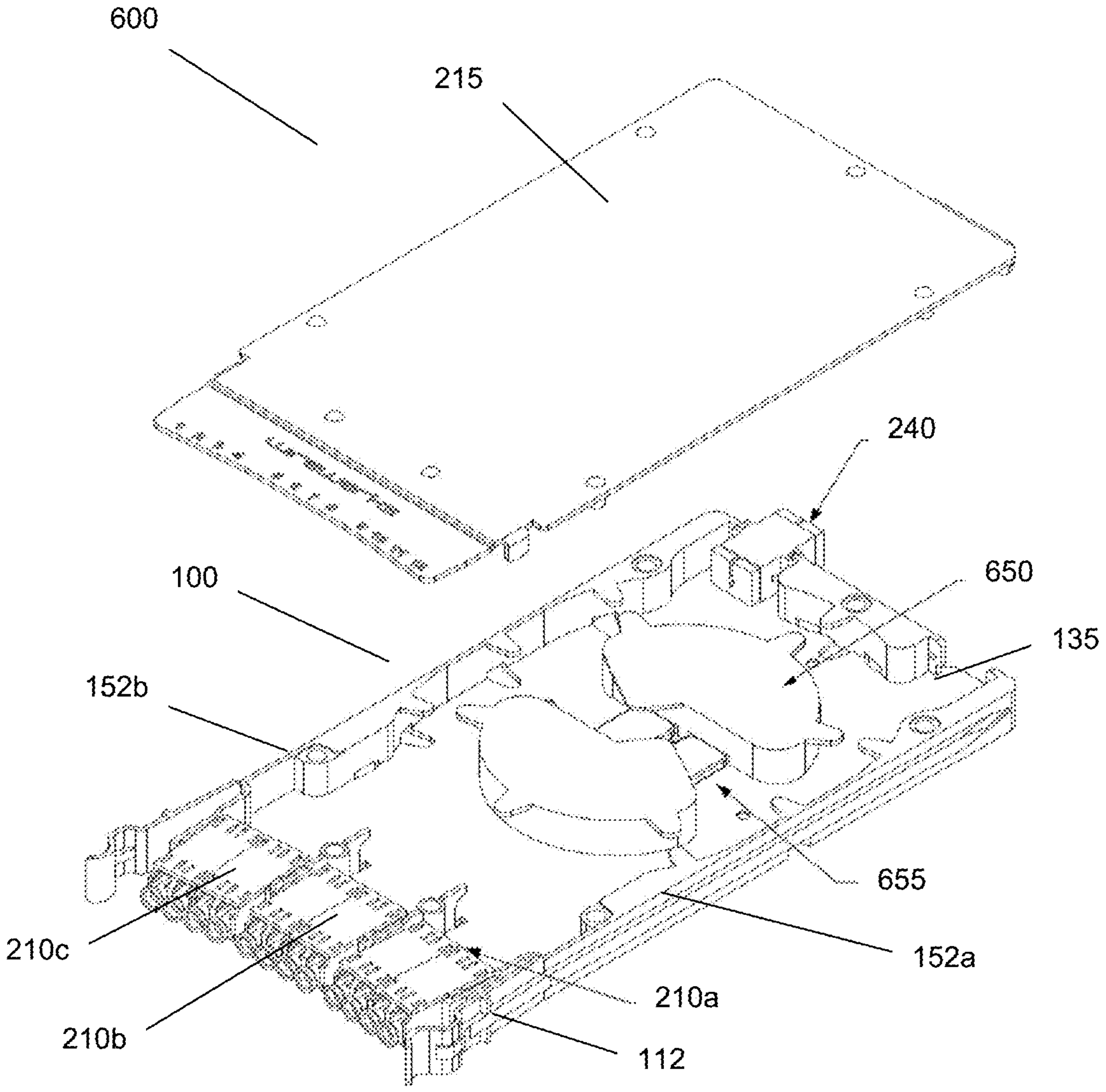
FIG. 13 illustrates a partially exploded perspective top view of a 12F patch module with drop-in cable strain relief adapter and cable management system, in accordance with one embodiment of the present invention.

FIG. 13 depicts a 12F patch module 600 comprising housing 100, shown with cover 215 removed from the housing. This embodiment includes three LC fiber adapters 210. The housing includes sidewalls 152*a* and 152*b* and rear wall 153. Sidewall 152*a* is shown with linear guide rail 112. Patch module 600 includes a single strain relief adapter 240 seated in one rear adapter seat located on the rear wall 153, while the other rear adapter seat 135 is shown without a rear adapter. Patch module 600 is shown with cable management accessory 650, located within housing 100. Cable management accessory 650 includes a space 655 for cable routing.

Figure 14:
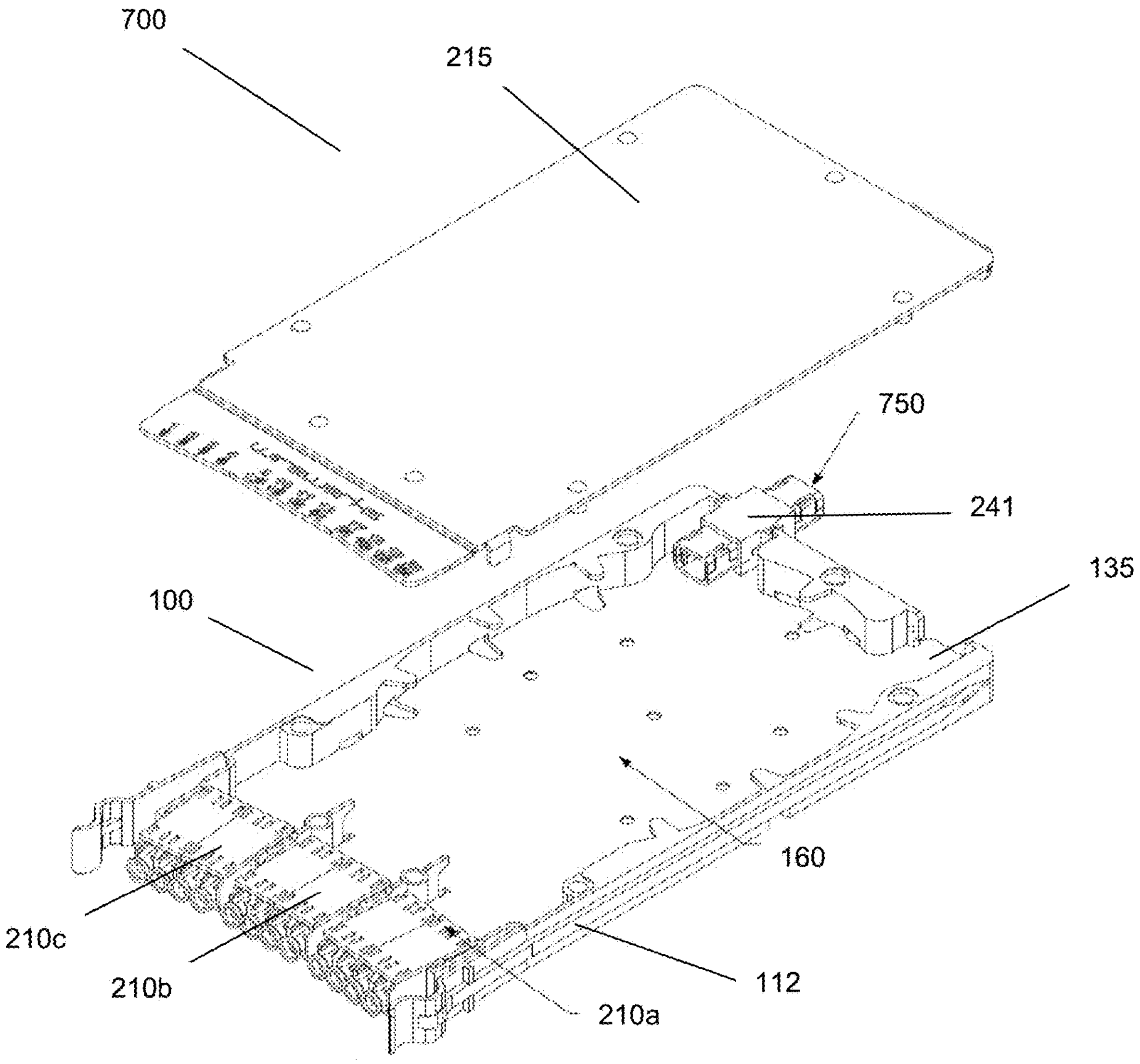
FIG. 14 illustrates a partially exploded perspective top view of a 12F module with drop-in cable strain relief adapter and fan-out kit, in accordance with one embodiment of the present invention.

FIG. 14 depicts a 12F patch module 700 comprising housing 100, shown with cover 215 removed from the housing. This embodiment includes three LC fiber adapters 210*a*, 210*b* and 210*c*. The housing includes sidewalls 152*a* and 152*b* and rear wall 153, and sidewall 152*a* is shown with linear guide rail 112. Patch module 200 includes a single strain relief clamp 241 seated in a rear adapter seat located on the rear wall 153, while the other rear adapter seat 135 is shown without a rear adapter. Strain relief clamp 241 receives fan-out kit housing 750.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The invention claimed is:

1. A module for use in a patch panel, the module comprising:
- one or more drop-in fiber adapters;
- one or more drop-in rear adapters;
- a housing having a first forward end and a second rearward end, the housing comprising:
  - a planar base extending between said first end and said second end,
  - two sidewalls extending upwardly from the longitudinal edges of said base and a rear wall extending upwardly from the transversal edge at said second end;
  - one or more drop-in fiber adapter seats located/arranged transversely along said first end of the housing, each said fiber adapter seat being defined by respective upwardly extending lateral walls, wherein the lateral walls of the adapter seats are configured to receive the fiber adapter in a vertical direction; and
  - one or more drop-in rear adapter seats located in the rear wall at said second end of the housing, each said rear adapter seat being configured to receive a respective rear adapter in a vertical direction; and
- a removable housing cover.

2. The module of claim 1, wherein the one or more drop-in fiber adapters comprise three fiber adapters.

3. The module of claim 2, wherein the two outermost fiber adapters are each seated at an inward angle of about 5 degrees relative to a transverse axis of the module.

4. The module of claim 1, wherein the fiber adapters are LC adapters, SN adapters or SC adapters.

5. The module of claim 1, wherein the one or more drop-in rear adapters comprise two rear adapters.

6. The module of claim 5, wherein each said rear adapter is an MPO adapter.

7. The module of claim 5, wherein each said rear adapter is a strain relief adapter.

8. The module of claim 7, wherein the strain relief adapter comprises a cable strain relief clamp and a rubber insert configured to fit within the strain relief clamp.

9. The module of claim 5, wherein each said rear adapter comprises a strain relief clamp and a fan-out kit.

10. The module of claim 1, wherein each fiber adapter comprises a tab on each lateral/side surface, and the lateral walls of the adapter seats each comprise a vertical slot configured to slidably receive a respective tab of the fiber adapter.

11. The module of claim 1, wherein the planar base is provided with a cable management system.

12. The module of claim 1, wherein the housing cover is formed from a metallic material.

13. The module of claim 1, wherein the housing cover is attached to the housing using screws.

14. The module of claim 1, wherein the sidewalls of the housing comprise linear guiding rails on an external surface configured for sliding engagement with complementary sliding guides on the patch panel.

15. The module of claim 1, wherein the lateral walls of the rear adapter seats each comprise a tab, and each rear adapter comprises a vertical slot on each lateral/side surface configured to slidably receive a respective tab of the rear adapter.

16. A cable distribution system comprising:
- one or more modules as defined in claim 1; and
- at least one patch panel configured to receive the one or more modules in respective module channels.

17. The system of claim 16, wherein the sidewalls of the housing comprise linear guiding rails on an external surface configured for sliding engagement with complementary sliding guides on the patch panel.

18. A method for assembling a module comprising an end-to-end connected fiber assembly, comprising the steps of:
- providing a housing having a first forward end and a second rearward end, the housing comprising:
  - a planar base extending between said first end and said second end,
  - two sidewalls extending upwardly from the longitudinal edges of said base and a rear wall extending upwardly from the transversal edge at said second end;
  - one or more drop-in fiber adapter seats located/arranged transversely along said first end of the housing, each said fiber adapter seat being defined by respective upwardly extending lateral walls, wherein the lateral walls of the adapter seats are configured to receive the fiber adapter in a vertical direction; and
  - one or more drop-in rear adapter seats located in the rear wall at said second end of the housing, each said rear adapter seat being configured to receive a respective rear adapter in a vertical direction; and
- providing a fiber assembly comprising a fiber harness plugged into at least one fiber adapter at a first end and at least one rear adapter at a second end;
- dropping the fiber assembly into the housing, wherein each said fiber adapter is placed in a respective fiber adapter seat and each said rear adapter is placed in a respective rear adapter seat; and
- installing a cover onto the housing.

19. The method of claim 18, further comprising at least one fiber patch cord plugged into a respective fiber adapter.

20. The method of claim 18, wherein the rear adapter is an MPO adapter connected to an MPO cable.

21. The method of claim 18, wherein the rear adapter is a strain relief adapter.

22. The method of claim 21, wherein the fiber assembly is a pre-terminated fiber cable assembly and the strain relief adapter secures the pre-terminated fiber cable assembly.

* * * * *